(12) United States Patent
Hiratsuka et al.

(10) Patent No.: US 9,488,884 B2
(45) Date of Patent: Nov. 8, 2016

(54) LIQUID CRYSTAL DISPLAY DEVICE

(71) Applicant: Japan Display Inc., Tokyo (JP)

(72) Inventors: Takato Hiratsuka, Chiba (JP); Osamu Itou, Hitachi (JP); Miharu Otani, Chiba (JP); Toshimasa Ishigaki, Chiba (JP); Daisuke Sonoda, Chiba (JP)

(73) Assignee: Japan Display Inc., Tokyo (JP)

( * ) Notice: Subject to any disclaimer, the term of this patent is extended or adjusted under 35 U.S.C. 154(b) by 95 days.

(21) Appl. No.: 13/957,483

(22) Filed: Aug. 2, 2013

(65) Prior Publication Data

US 2014/0036209 A1 Feb. 6, 2014

(30) Foreign Application Priority Data

Aug. 3, 2012 (JP) .................. 2012-173458

(51) Int. Cl.
*G02F 1/1339* (2006.01)
*G02F 1/1343* (2006.01)

(52) U.S. Cl.
CPC ....... *G02F 1/13439* (2013.01); *G02F 1/13394* (2013.01); *G02F 1/134363* (2013.01)

(58) Field of Classification Search
USPC ................................. 349/155–156
See application file for complete search history.

(56) References Cited

U.S. PATENT DOCUMENTS

| | | | |
|---|---|---|---|
| 6,459,468 B2 * | 10/2002 | Shibahara | 349/155 |
| 6,525,791 B1 * | 2/2003 | Tsuda et al. | 349/106 |
| 6,535,264 B1 * | 3/2003 | Imabayashi et al. | 349/155 |
| 6,667,077 B1 * | 12/2003 | Oaku | C09K 19/0403 252/299.01 |
| 2004/0263764 A1 * | 12/2004 | Kim et al. | 349/155 |
| 2005/0099578 A1 * | 5/2005 | Kim et al. | 349/155 |
| 2005/0117108 A1 | 6/2005 | Kume et al. | |
| 2007/0132936 A1 * | 6/2007 | Lee et al. | 349/156 |
| 2007/0139604 A1 * | 6/2007 | Paik et al. | 349/156 |
| 2009/0015780 A1 | 1/2009 | Choi et al. | |
| 2009/0153761 A1 | 6/2009 | Park et al. | |

(Continued)

FOREIGN PATENT DOCUMENTS

| | | |
|---|---|---|
| CN | 101726928 A | 6/2010 |
| CN | 101900913 A | 12/2010 |

(Continued)

OTHER PUBLICATIONS

Office Action dated Aug. 5, 2015 regarding a corresponding Chinese Patent Application No. 201310332841.8.
Japanese Office Action, issued on Mar. 1, 2016, for corresponding JP application No. 2012-173458. With partial translation.

*Primary Examiner* — Hoan C Nguyen
(74) *Attorney, Agent, or Firm* — TYPHA IP LLC (57) ABSTRACT

In a liquid crystal display device having wall structures, the generation of low-temperature shock bubbles is suppressed. Also, electrodes and the like within substrates are prevented from being damaged during manufacturing. The liquid crystal display device includes a first substrate, a second substrate that is disposed to face the first substrate, a liquid crystal layer that is disposed between the first substrate and the second substrate, wall structures that are formed on the first substrate, pixel electrodes that are disposed on at least side wall of the wall structures, a common electrode that is formed on the first substrate, and a plurality of pixels including the pixel electrodes and the common electrode, in which higher portions are partially disposed on a surface of the second substrate, and the higher portions come into contact with the wall structures to bring the first substrate into contact with the second substrate.

11 Claims, 9 Drawing Sheets

(56) References Cited

U.S. PATENT DOCUMENTS

2009/0219478 A1* 9/2009 Park .................. G02F 1/13731
                                                        349/155
2010/0302492 A1* 12/2010 Kubota ............ G02F 1/134363
                                                        349/138
2012/0113343 A1* 5/2012 Konno ............. G02F 1/134363
                                                        349/39

FOREIGN PATENT DOCUMENTS

| JP | 2003-279997 A | 10/2003 |
|----|---------------|---------|
| JP | 2004-341465 A | 12/2004 |
| JP | 2005-157224   | 6/2005  |
| JP | 2006-084779 A | 3/2006  |
| JP | 2009-145865   | 7/2009  |
| JP | 2010-210866   | 9/2010  |

* cited by examiner

LIQUID CRYSTAL DISPLAY DEVICE

CROSS-REFERENCE TO RELATED APPLICATION

The present application claims priority from Japanese application JP 2012-173458 filed on Aug. 3, 2012, the content of which is hereby incorporated by reference into this application.

BACKGROUND OF THE INVENTION

1. Field of the Invention

The present invention relates to a liquid crystal display device, and more particularly to a liquid crystal display device that is driven by a so-called in-plane switching system.

2. Description of the Related Art

In the liquid crystal display devices, a gap formed between a TFT substrate on which pixel electrodes and thin film transistors (TFTs) are formed, and a counter substrate on which color filters, etc., are formed is filled with a liquid crystal, and molecules of the liquid crystal are driven and controlled by an electric field to form an image. Among the liquid crystal display devices, liquid crystal display devices driven by a system called in-plane switching system (IPS system) are frequently used.

The IPS system is a liquid crystal drive system in which liquid crystal molecules are oriented horizontally to a panel surface, and an electric field (lateral electric field) parallel to the panel surface is applied to rotate the liquid crystal molecules in a plane horizontal to the panel surface. In the liquid crystal display device of the IPS system, a common electrode is also formed on a first substrate side formed with video signal lines (drain lines), scanning signal lines (gate lines), thin film transistors, and pixel electrodes, etc. A liquid crystal layer is driven by an electric field in an in-plane direction of the first substrate, which is generated by a difference between voltages applied to the pixel electrodes and the common electrode. In the liquid crystal display device of the IPS system thus configured, for example, linear pixel electrodes overlap with an upper layer of the planar common electrode formed of a transparent conductive film via an insulating film.

Among the IPS systems, in recent years, the following system has been frequently used for the purpose of further increasing the aperture ratio of the liquid crystal display device. In the system, wall structures are so formed as to bridge between the adjacent pixels of the liquid crystal display device, the pixel electrodes are formed on a side wall of the wall structures. Further, the common electrode and a counter electrode are formed on the TFT substrate and the counter substrate which face each other, respectively, and an electric field parallel to the substrate surface is generated to drive the liquid crystal layer.

Also, a gap formed between the TFT substrate and the counter substrate in the liquid crystal display device is as very small as several microns, and it is extremely important to appropriately set the gap between the TFT substrate and the counter substrate for the purpose of controlling light transmission by the liquid crystal. Under the circumstances, there has been proposed that the above wall structures also function as spacers for holding the gap between the TFT substrate and the counter substrate.

Incidentally, in manufacturing the liquid crystal display device, there is a need to pour liquid crystal between the substrates, and seal the liquid crystal therebetween. As a liquid crystal filling method frequently used in recent years, there is a method called one drop fill method (ODF system) in which a required amount of liquid crystal first falls in drops on one substrate, and thereafter is sealed in cooperation with the other substrate to perform filling of the liquid crystal therebetween.

The ODF system is advantageous in that a large-sized manufacturing facility is not required, a time required for manufacturing can be reduced, and the mass production of liquid crystal is facilitated, as compared with the related art liquid crystal injection method. However, a very high precision is required for retaining droplets of liquid crystal, and the above gap between the substrates.

When the ODF system is applied to the liquid crystal display device allowing the wall structures to provide the spacer function as described above, there is a risk that a low-temperature shock bubble may be generated. The low-temperature shock bubbles represent bubbles generated under a low-temperature environment particularly at about $-20°$ C. among so-called vacuum bubbles generated in the case where a negative pressure is generated in the liquid crystal layer, and gas components such as nitrogen which have blended into the liquid crystal layer is eluted therefrom, when a shock caused by an external force is applied to the liquid crystal panel or the like into which the liquid crystal has been poured.

The low-temperature shock bubbles are difficult to again solve, and hardly dissolve, and therefore contribute heavily to the generation of display unevenness or the like. The low-temperature shock bubbles are easily generated in contact portions of the substrates and the spacers, and it is experimentally confirmed that a performance for suppressing the generation of the low-temperature shock bubbles is inversely proportional to contact areas of the spacers and the substrates.

The reason why the generation of the low-temperature shock bubbles is problematic in the liquid crystal display device of the IPS system employing the wall structures is that since a height of the wall structures is kept constant, and the wall structures are formed on all of long sides of pixels, only so-called main spacers are arrayed with a high density, and there is no space in which sub-spacers slightly lower in height than the main spacers are arranged. That is, this is because the contact areas between the substrates and the spacers are increased as compared with a case in which the sub-spacers are arranged.

Also, in manufacturing the liquid crystal display device of the above ODF system where the wall structures also function as the spacers, the wall structures are subject directly to a pressure generated when the substrates are bonded together. This leads to a risk that ITO of electrodes, an interlayer insulating film, or the wall structures per se may be damaged.

JP 2005-157224 A discloses a technique in which the wall structures and supports are arranged between the substrates to regulate a thickness of the liquid crystal layer in the liquid crystal display device of a VA system. Also, JP 2009-145865 A and JP 2010-210866 A disclose a technique in which the thickness between the substrates is retained with the use of the spacers. However, in all of those publications, it is insufficient to suppress the low-temperature shock bubbles of the IPS system, and prevent the wall structures from being damaged.

SUMMARY OF THE INVENTION

The present invention has been made in view of the above circumstances, and one object of the present invention is to suppress the generation of the low-temperature shock bubbles in a liquid crystal display device having wall structures. Another object of the present invention is to prevent electrodes and the like within substrates from being damaged during manufacturing in the liquid crystal display device having the wall structures.

In order to solve the above problems, the liquid crystal display device according to the present invention provides the following technical features.

(1) The liquid crystal display device includes: a first substrate; a second substrate that is disposed to face the first substrate; a liquid crystal layer that is disposed between the first substrate and the second substrate; wall structures that are formed on the first substrate; pixel electrodes that are disposed on at least side wall of the wall structures; a common electrode that is formed on the first substrate; and a plurality of pixels including the pixel electrodes and the common electrode, in which higher portions are partially disposed on a surface of the second substrate, and the higher portions come into contact with the wall structures to bring the first substrate into contact with the second substrate.

(2) In the liquid crystal display device according to the item (1), each of the higher portions is a spacer film partially formed on the second substrate.

(3) In the liquid crystal display device according to the item (1), the higher portions are formed by overlapping end portions of adjacent color filter films formed on the second substrate with each other.

(4) In the liquid crystal display device according to any one of the items (1) to (3), the wall structures each have a protrusion not adjacent to an opening portion of each of the pixels, and the higher portions come in contact with the wall structures in the protrusion.

(5) In the liquid crystal display device according to the item (4), the pixel electrodes and the common electrode are not formed on a side surface of the protrusion.

(6) In the liquid crystal display device according to the item (5), an insulating film that separates the pixel electrodes and the common electrode from each other is not formed on the side surface of the protrusion.

(7) In the liquid crystal display device according to any one of the items (1) to (6), the number of pixels is different from the number of portions where the higher portions and the wall structures come into contact with each other.

(8) In the liquid crystal display device according to any one of the items (4) to (6), a center position of the protrusion in a width direction thereof is displaced from a center position of the spacer film in a width direction thereof.

(9) In the liquid crystal display device according to any one of the items (1) to (8), each of the pixels is bent in the vicinity of a center thereof in a longitudinal direction thereof.

According to the above respective technical features, the generation of the low-temperature shock bubbles can be suppressed in the liquid crystal display device having wall structures. Also, the electrodes within substrates or the like can be prevented from being damaged during manufacturing in the liquid crystal display device having the wall structures.

DETAILED DESCRIPTION OF THE INVENTION

Hereinafter, a liquid crystal display device 100 according to a first embodiment of the present invention will be described in detail with reference to FIGS. 1 to 8.

Figure 1:
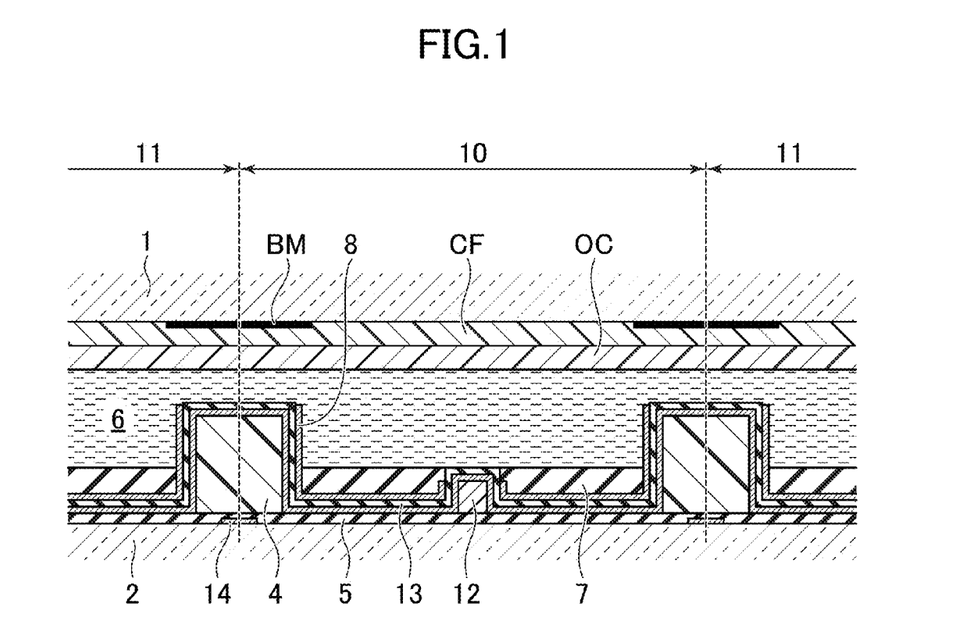
FIG. 1 is a cross-sectional view schematically illustrating a pixel configuration in a liquid crystal display device according to a first embodiment of the present invention.
Figure 2:
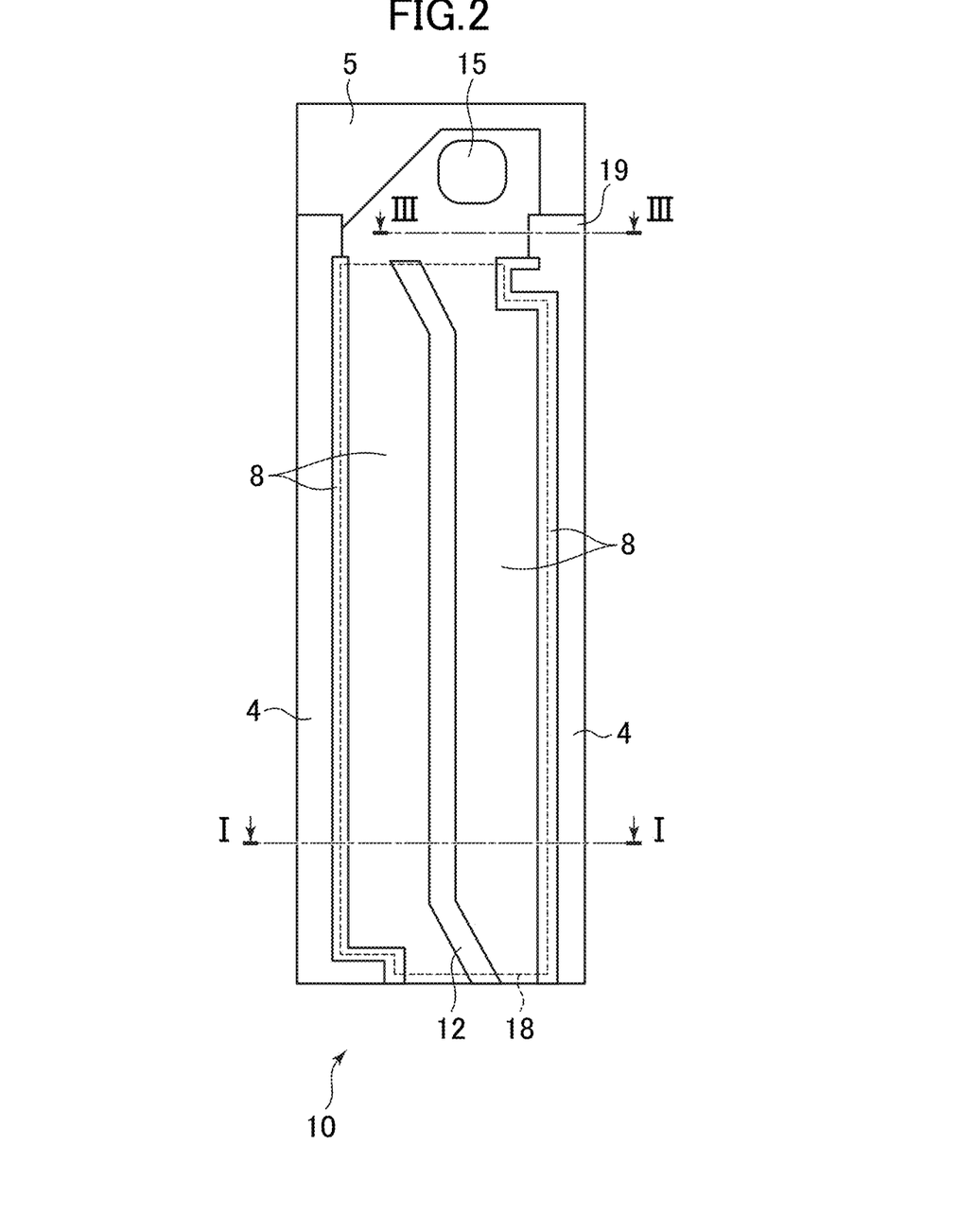
FIG. 2 is a plan view schematically illustrating the pixel configuration in the liquid crystal display device according to the first embodiment of the present invention.

FIG. 1 is a cross-sectional view schematically illustrating a pixel configuration in the liquid crystal display device 100 according to this embodiment, and FIG. 2 is a plan view schematically illustrating the pixel configuration in the liquid crystal display device 100 according to this embodiment.

As illustrated in FIG. 1, the liquid crystal display device 100 has a structure in which a TFT substrate 2 which is a first substrate, a color filter (CF) substrate 1 which is a second substrate disposed to face the TFT substrate 2, and a liquid crystal layer 6 disposed between the TFT substrate 2 and the CF substrate 1 are stacked on each other. Wall structures 4 and sub-wall structures 12 lower in height than the wall structures 4 are formed on the TFT substrate 2. Pixel electrodes 8 which are first electrodes disposed on side surfaces of the respective wall structures 4, and a common electrode 5 that is formed on the TFT substrate 2, and covers at least the sub-wall structures 12 are provided. In this embodiment, the pixel electrodes 8 are each disposed to cover the side surface of each wall structure 4 and a region between each wall structure 4 and each of the sub-wall structures 12, and a cross-sectional structure shown is substantially L-shaped. For that reason, the sub-wall structures 12 are not covered with the pixel electrodes 8 in a plan view. In this embodiment, the common electrode 5 is disposed to cover an overall surface of the TFT substrate 2, but has only to cover the sub-wall structures 12. That is, in the plan view, the common electrode 5 is not covered with the pixel electrodes 8 in a region where the sub-wall structures 12 are arranged. The pixel electrodes 8 and the common electrode 5 are separated from each other by an insulating film 13. Also, insulating films 7 are so disposed as to cover the pixel electrodes 8 in regions between the wall structures 4 and the sub-wall structures 12. The insulating films 7 may cover the sub-wall structures 12. In the drawing, an oriented film is omitted.

The CF substrate 1 has a red filter, a green filter, and a blue filter, and serves to color a light emitted from a backlight (not shown), and transmitted through the liquid crystal layer 6. Also, as will be described later, black matrix layers BM are formed on the CF substrate at positions between the respective pixels. Further, a counter electrode 9 and an overcoat layer OC are included.

The liquid crystal display device 100 is thus structured so that a given gap is defined between the CF substrate 1 and the TFT substrate 2 which face each other, and the gap is filled with liquid crystal to form the liquid crystal layer 6. The liquid crystal layer 6 is driven by an electric field generated between the pixel electrodes 8 and the common electrode 5 arranged on the sub-wall structures 12. That is, a region that is sandwiched between the adjacent wall structures 4 in which the liquid crystal is driven by each pixel electrode 8 and the common electrode 5 which are applied with a common potential forms one pixel 10. FIG. 1 illustrates a cross-section of one pixel in the liquid crystal display device 100.

The wall structures 4 are each arranged in a light shielding region in which a light is shielded by each of the black matrix layers BM, and drain signal lines 14 are arranged on bottoms of the respective wall structures 4. Also, gate signal lines that supply scanning signals not shown are arranged on the TFT substrate 2 in a matrix in addition to the drain signal lines 14. The rectangular pixel 10 is formed by a pair of gate signal lines and drain signal lines 14. In addition, switching elements such as TFTs, and other circuit elements are arranged on the TFT substrate 2, but those elements do not appear in the cross-section illustrated in FIG. 1.

The CF substrate 1 and the TFT substrate 2 are generally formed of, for example, glass substrates, however, may be formed of transparent resin substrates having insulation properties. Also, the pixel electrodes 8 and the common electrode 5 are formed by a method of forming an electrode film made of a transparent conductive material such as ITO (indium tin oxide) through a sputtering technique, and selectively etching the electrode film through a photolithography. Also, the pixel electrodes 8 and the common electrode 5 may be made of a variety of metal oxide materials such as InZnO (indium zinc oxide) aside from ITO. The wall structures 4 and the sub-wall structures 12 are formed of, for example, a photosensitive resin material through the known photolithography and the like.

The wall structures 4 are formed in the light shielding regions drawing boundaries between the pixel 10 and adjacent pixels 11, or in a peripheral circuit region of a display unit which is not an effective display region of the liquid crystal display device 100. In this example, the light shielding regions represent regions formed on the CF substrate 1, which do not contribute to display, but block light. In this embodiment, the black matrix layers BM made of a photosensitive resin and the like are formed as the light shielding regions. The light shielding regions may be formed by giving a light shielding capability to, for example, the TFT, the gate signal lines, the drain signal lines 14 or the like instead of the black matrix layers BM. Also, as described above, the pixel electrodes 8 are formed on at least the side surfaces of the wall structures 4 in order to apply an even lateral electric field to the liquid crystal layer 6. However, it is preferable that the pixel electrodes 8 are not formed on tops of the wall structures 4. This is because short-circuiting to the pixel electrodes 8 of the adjacent pixels 11 is avoided. Therefore, in forming the pixel electrodes 8, an appropriate mask is used, or a separation film may be formed on the top of each wall structure 4 in advance, and removed after the electrode film has been formed. The insulating films 7 are configured to prevent unnecessary short-circuiting between the common electrode 5 and the pixel electrodes 8, or between those electrodes and the other circuit elements. The insulating films 7 are formed of a material such as SiN through a known CVD technique and the like.

With the above configuration, an electric field of an intensity corresponding to a voltage applied to the pixel electrodes 8 having a direction component parallel to the CF substrate 1 and the TFT substrate 2 is generated between a portion of each pixel electrode 8 particularly formed on the side surface of the wall structure 4, and a portion of the common electrode 5 covering the sub-wall structure 12. The liquid crystal layer 6 is driven by the electric field thus generated so that an orientation direction of molecules of the liquid crystal in the liquid crystal layer 6 rotates in a horizontal plane. The liquid crystal display device of this type is generally called IPS system, or in-plane switching system, and known as a system that enables a wide viewing angle display. The liquid crystal display device 100 according to this embodiment conducts normally black display that minimizes (displays with black) a light transmittance if no electric field is applied to the liquid crystal layer 6, and increases the light transmittance by application of the electric field.

FIG. 2 is a plan view schematically illustrating the pixel configuration in the liquid crystal display device 100 according to the first embodiment of the present invention. As illustrated in the figure, the pixel 10 is substantially rectangular, and configured by a region surrounded by the gate signal lines and the drain signal lines not shown. FIG. 2 illustrates a structure formed on the TFT substrate 2, and the insulating films 7 and 13 are omitted from the drawings.

In this embodiment, the wall structures 4 are continuously formed so as to sandwich the pixels therebetween on both of right and left end sides of the pixels. A region which is an opening portion 18 of the pixel 10, that is, a light emitting portion occupying the pixel 10, transmits a light beam from the backlight while adjusting the transmittance of the light beam is sandwiched between the pixel electrodes 8 formed on the side surfaces of the wall structures 4, and forms the lateral electric field between the pixel electrodes 8 and the common electrode 5 covering the sub-wall structure 12. This region is indicated by a dashed line in the figure. In the pixel 10, a non-opening portion which is a portion other than the opening portion 18 is defined as the above-mentioned light shielding region for the purpose of avoiding a degradation in contrast or chromatic purity due to leakage of a light beam from the backlight. A part of each wall structure 4 forms a protrusion 19 protruded from a region adjacent to the opening portion 18. That is, a side surface of the protrusion 19 is located on the non-opening portion. Also, a through-hole 15 is structured to connect the pixel electrodes 8 and a drain electrode (or a source electrode) of the TFT. FIG. 1 described above illustrates a cross-section taken along a line I-I in FIG. 2.

Figure 3:
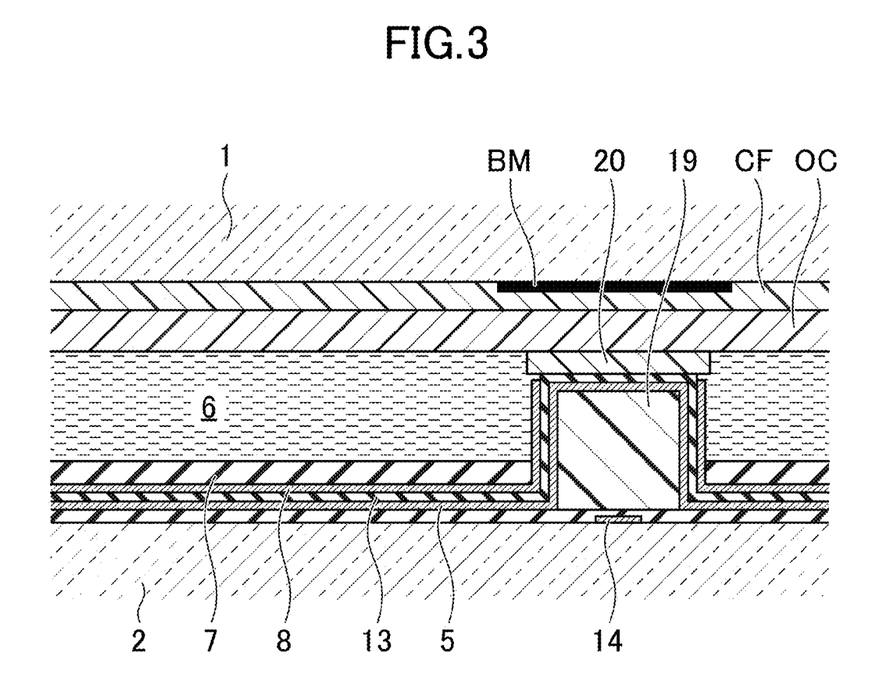
FIG. 3 is a cross-sectional view taken along a line III-III in FIG. 2.

FIG. 3 is a cross-sectional view taken along a line III-III in FIG. 2. As illustrated in the figure, a spacer film 20 is formed further on an upper layer of the overcoat layer OC of the CF substrate 1 immediately above the protrusion 19 of the wall structure 4. A height of a surface of the CF substrate 1 is partially higher as much as the thickness of the spacer film 20. The wall structure 4 comes into contact with a surface of the spacer film 20 formed on the CF substrate 1 in the protrusion 19, to thereby define a width of a gap between the CF substrate 1 and the TFT substrate 2. That is, most of portions other than the protrusion 19 in the wall structure 4 come out of contact with the CF substrate 1, and provide a gap corresponding to the thickness of the spacer film 20 therebetween.

With the above structure, a distance between the CF substrate 1 and the TFT substrate 2 is regulated by the contact within a slight range where the protrusion 19 and the spacer film 20 overlap with each other in the plan view, and a flexure of the CF substrate 1 in a normal direction to the surface is permitted in a remaining most range. For that reason, even when a volume of the liquid crystal layer 6 is contracted due to a low temperature, a change in the volume is absorbed by the flexure of the CF substrate 1, and the liquid crystal layer 6 is not exposed to a remarkable reduced pressure atmosphere to prevent the low-temperature shock bubbles from being generated.

In this embodiment, the spacer film 20 is formed of an organic resin film such as polyimide. This material has an advantage of preventing the wall structures 4 from being damaged by exerting a large local stress on the wall structures 4 when the CF substrate 1 and the TFT substrate 2 are bonded together in the manufacture of the liquid crystal display device 100 using the ODF system because the spacer film 20 is slightly elastically deformed. However, the material of the spacer film 20 is not limited to the organic resin film. Also, instead of the spacer film 20, end portions of color filter layers CF (therefore, manufactured in another process) adjacent to each other and different in color may overlap with each other to partially form higher portions on the surface of the CF substrate 1. In this case, there is an advantage in that a process for manufacturing the spacer film 20, separately, is unnecessary.

Figure 4:
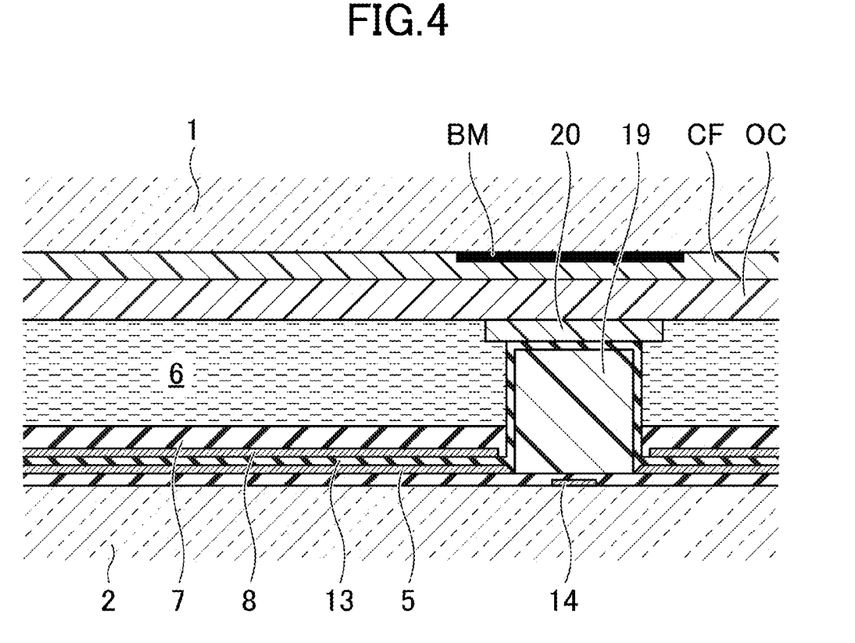
FIG. 4 is a cross-sectional view illustrating one modified example of the liquid crystal display device according to the first embodiment of the present invention.

FIG. 4 is a cross-sectional view illustrating one modified example of the liquid crystal display device 100 according to this embodiment. FIG. 4 corresponds to FIG. 3, and illustrates a cross-section taken along a line III-III in FIG. 2 as in FIG. 3. In this modified example, the pixel electrode 8 and the common electrode 5 are not formed on the side surface and a top surface of the protrusion 19. The reason will be described below. That is, in manufacturing the liquid crystal display device 100 through the ODF system, a pressure for bonding the CF substrate 1 and the TFT substrate 2 together is concentrated on the protrusion 19 of the wall structure 4 where the CF substrate 1 and the TFT substrate 2 come into contact with each other. The pressure is exerted as a force for compressing the wall structure 4 in a vertical direction. In this situation, the compressing force in the in-plane direction of the film is also exerted on the film formed on the side surface of the wall structure 4. Therefore, when a sticking force of the film to the wall structure 4 is low, or the film is weak in deformation such that the film is hardly elastically deformed, and shows brittleness, there is a risk that the film is damaged, separated from the wall structures 4, and mixed into the liquid crystal layer 6 as a foreign matter. In this embodiment, the pixel electrodes 8 and the common electrode 5 are made of metal oxide such as ITO as described above, and weak in deformation, and therefore the film is not formed on the side surface of the protrusion 19 in advance.

Figure 5:
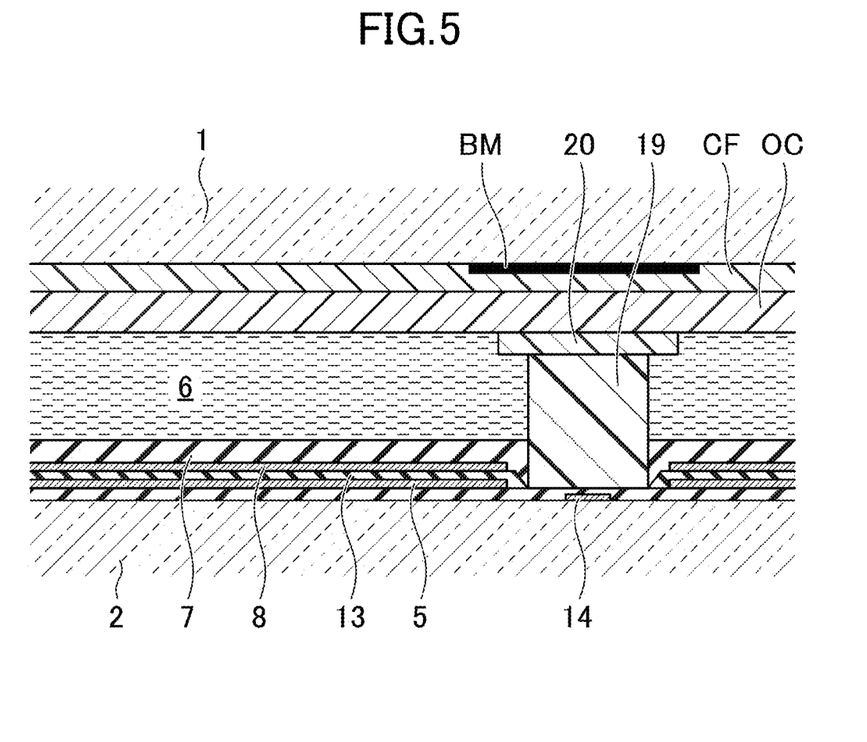
FIG. 5 is a cross-sectional view illustrating another modified example of the liquid crystal display device according to the first embodiment of the present invention.

FIG. 5 is a cross-sectional view illustrating another modified example of the liquid crystal display device 100 according to this embodiment. FIG. 5 also corresponds to FIG. 3, and illustrates a cross-section taken along a line III-III in FIG. 2 as in FIG. 3. In this modified example, the pixel electrode 8 and the common electrode 5 as well as the insulating film 13 which is an inorganic film such as SiN are not formed on the side surface of the protrusion 19. In the manufacturing using the ODF system, those films are prevented from being damaged or separated.

Incidentally, in the above description, the portion where the protrusion 19 and the spacer film 20 come into contact with each other is provided at a rate of one to one pixel. However, the present invention is not limited to this configuration, but the number and layout of portions where the protrusion 19 and the spacer film 20 come into contact with each other may not always be provided on one to one basis such that one portion is provided for a plurality of pixels. For example, one partial higher place of the wall structure 4 may be provided for the plurality of pixels.

Figure 6:
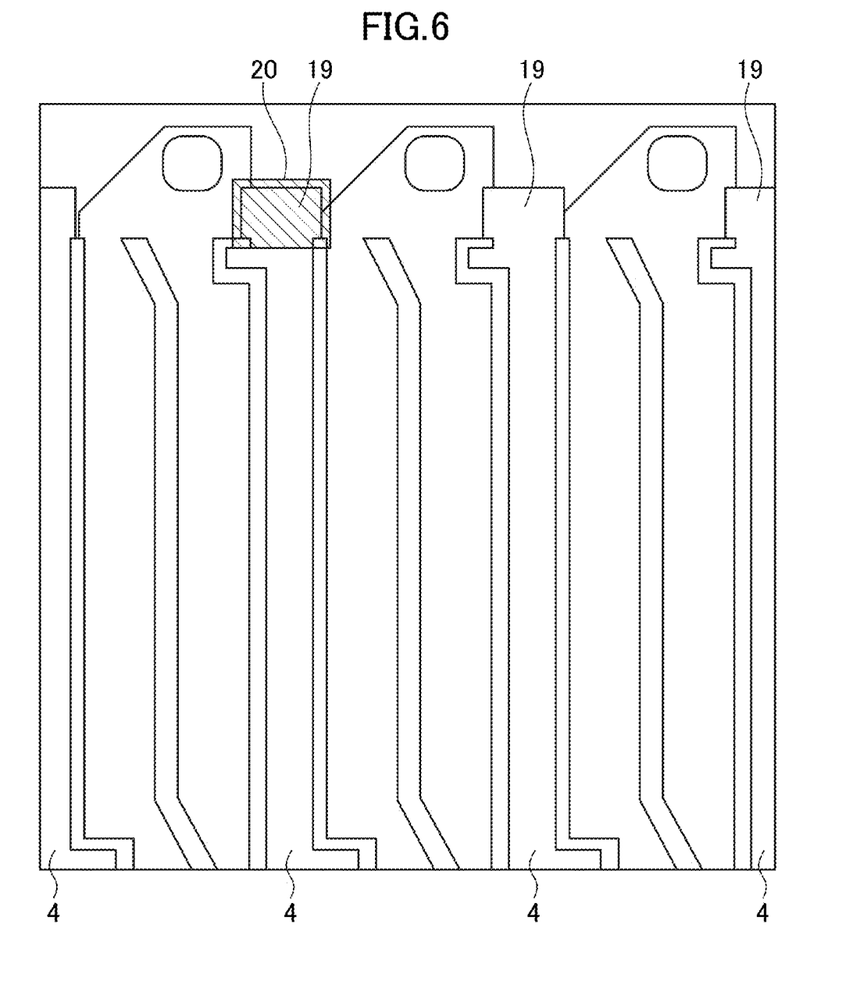
FIG. 6 is a plan view schematically illustrating one configuration of three adjacent pixels.
Figure 7:
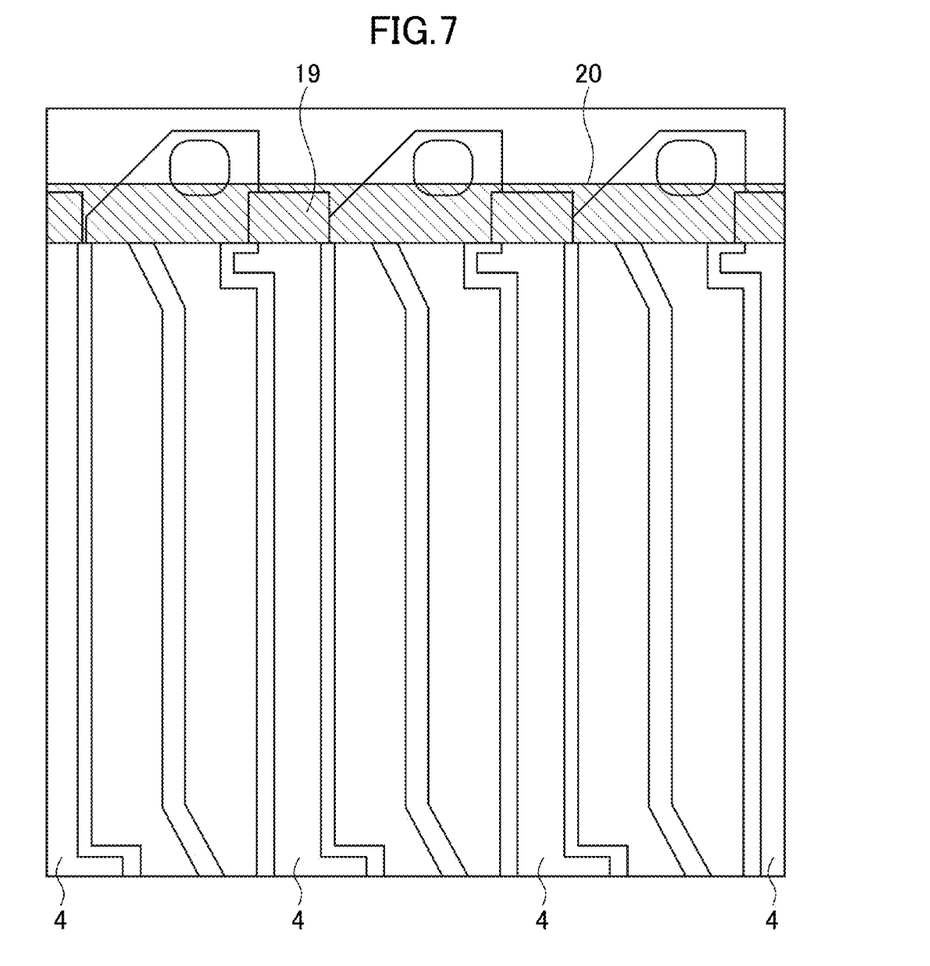
FIG. 7 is a plan view schematically illustrating another configuration of three adjacent pixels.

FIGS. 6 and 7 are plan views schematically illustrating configurations of three adjacent pixels. In an example illustrated in FIG. 6, one protrusion 19 is provided for each of the three adjacent pixels. On the other hand, the spacer film 20 disposed on the CF substrate 1 is provided on only a portion hatched in the figure. Therefore, the protrusion 19 and the spacer film 20 come into contact with each other at a rate of one to three pixels. On the other hand, in an example illustrated in FIG. 7, the protrusion 19 is provided for only one pixel among the three adjacent pixels, as a result of which the protrusion 19 and the spacer film 20 come into contact with each other at a rate of one to three pixels. The spacer film 20 illustrated in FIG. 7 is formed into a belt-like planar shape extending in a lateral direction of the pixels. However, the spacer film 20 may be formed into any shape if the spacer film 20 is formed at positions corresponding to the protrusions 19. For example, the spacer film 20 may be formed into a shape illustrated in FIG. 6 without any problem.

The number and layout of the portions where the protrusion 19 and the spacer film 20 come into contact with each other may be arbitrary. However, as the number of those portions is larger, and those portions are more densely arranged, the gap between the CF substrate 1 and the TFT substrate 2 is not changed, resulting in a high risk that the low-temperature shock bubbles are generated. On the other hand, as the number of the portions is smaller, and those portions are more coarsely arranged, the CF substrate 1 (or the TFT substrate 2) is more flexible, and the thickness of the liquid crystal layer 6 is easily changeable, resulting in a high risk that an image to be displayed becomes uneven. Therefore, the number and layout of the portions where the protrusion 19 and the spacer film 20 come into contact with each other should be selected to be optimum according to products to be manufactured. Also, for the layout, the portions where the protrusion 19 and the spacer film 20 come into contact with each other may be regularly arranged (for example, lattice layout), or may be irregularly arranged.

Incidentally, as described above, a possibility that the low-temperature shock bubbles are generated, and a possibility that the image becomes uneven are changed according to the number and layout density of the portions where the protrusion 19 and the spacer film 20 come into contact with each other. More precisely, it is assumed that the portions where the protrusion 19 and the spacer film 20 come into contact with each other are equally arranged, regardless of the regularity or irregularity, within the image display region, in which the pixels are formed. In this case, the possibility that the low-temperature shock bubbles are generated, and the possibility that the image becomes uneven are changed according to a size of an area of the portions where the CF substrate 1 and the TFT substrate 2 come into contact with each other (they are equal to the portions where the protrusion 19 and the spacer film 20 come into contact with each other) within the image display region.

In this embodiment, a method of forming the protrusion 19 and the spacer film 20 is not particularly restricted. In general, it is reasonable to form the protrusion 19 and the spacer film 20 through the photolithography. When a microscopic structure is fabricated through the photolithography, a minimum limit of the size of the microscopic structure that can be formed is present according to the resolution. For that reason, in the structure in which the spacer film 20 is arranged immediately above the protrusion 19 as illustrated in FIG. 3, there is a minimum value to which or more the contact area of the protrusion 19 and the spacer film 20 cannot be reduced.

Figure 8:
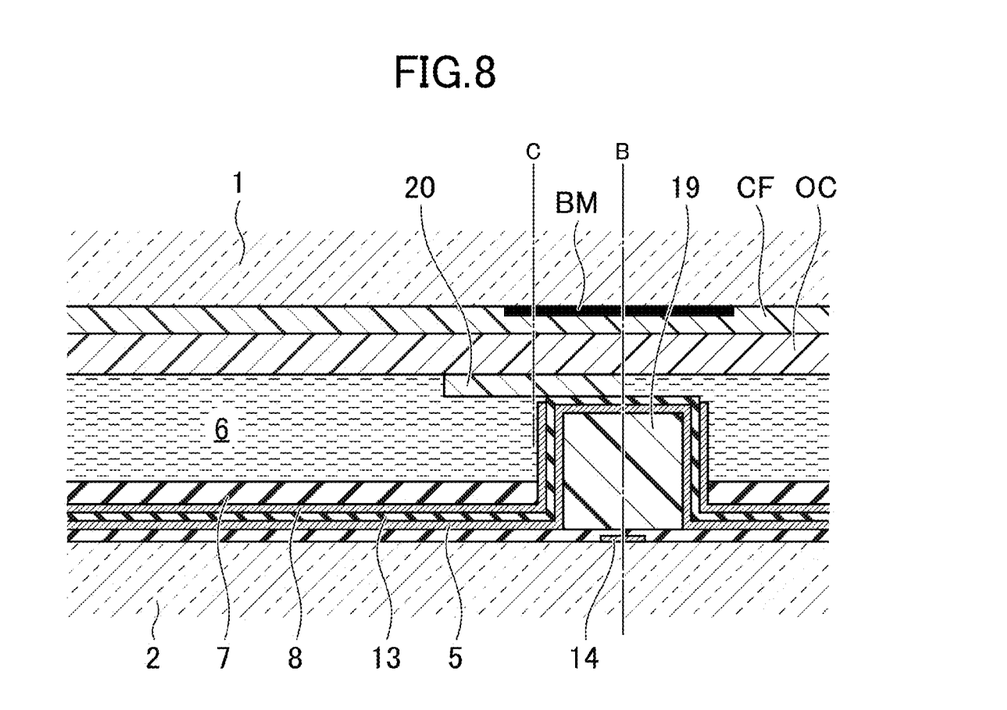
FIG. 8 is a cross-sectional view illustrating an example in which a center position of a protrusion in a width direction thereof is displaced from a center position of a spacer film in a width direction thereof.

Under the circumstances, as illustrated in FIG. 8, a center position B of the protrusion 19 in the width direction, and a center position C of the spacer film 20 in the width direction are displaced from each other, to thereby bring the top surface of the protrusion 19 into contact with the spacer film 20 at an off-centered position. As a result, the contact area of the protrusion 19 and the spacer film 20 can be adjusted to be smaller than that in the case illustrated in FIG. 3.

Figure 9:
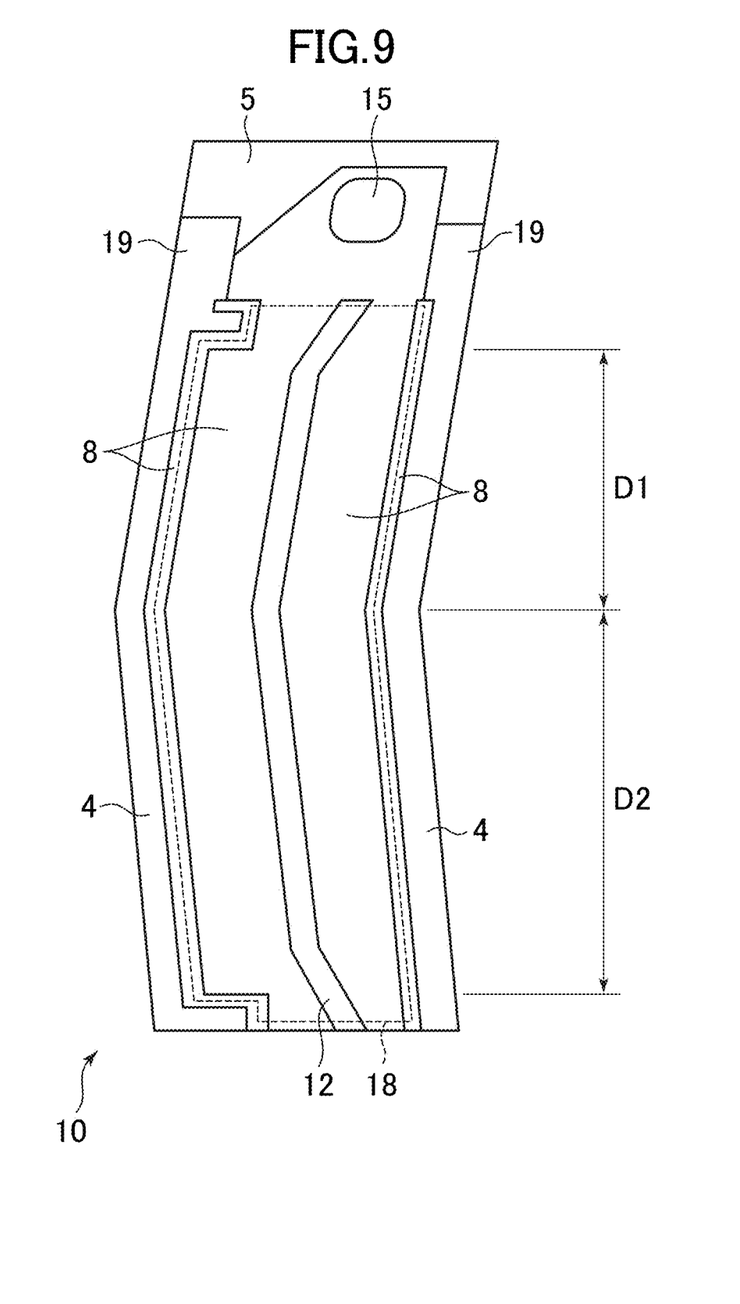
FIG. 9 is a plan view schematically illustrating a pixel configuration in a liquid crystal display device according to a second embodiment of the present invention.

Subsequently, a second embodiment of the present invention will be described. FIG. 9 is a plan view schematically illustrating a pixel configuration in a liquid crystal display device 200 according to a second embodiment of the present invention. FIG. 9 is a diagram corresponding to FIG. 2 in the liquid crystal display device 100 of the above first embodiment. Also, the liquid crystal display device 200 is identical with the liquid crystal display device 100 of the first embodiment except that the planar shape of the overall pixel 10 is different. Therefore, common parts are denoted by identical symbols, and a redundant description will be omitted.

As illustrated in FIG. 9, the pixel 10 in the liquid crystal display device 200 is bent substantially in the center thereof in the longitudinal direction, and has a region D1 and a region D2 so that angles formed by the wall structures 4 and the sub-wall structures 12 are opposite to each other with respect to the layout direction (vertical direction in the figure) of the pixel 10 in the longitudinal direction. For that reason, the portions of the pixel electrode 8 formed on the side surface of the wall structures 4 and the common electrode 5 covering the sub-wall structures 12 are also arranged at angles opposite to each other in the region D1 and the region D2. Also, the shape of the opening portion 18 indicated by a dashed line is bent substantially in the center thereof in the longitudinal direction as with the shape of the overall pixel 10.

The configuration shown is known as a so-called multidomain structure, and electric fields generated in the region D1 and the region D2 are reversely symmetric with each other so that rotating angles of the liquid crystal in the respective regions are reversely symmetric with each other. With the above configuration, an unintentional coloring generated when the liquid crystal display device 100 is viewed from a specific direction neutralize each other in the region D1 and the region D2 to display an image with a high quality in a wide viewing angle.

EXAMPLES

Various liquid crystal display devices 100 using the structures illustrated in FIGS. 7 and 8 in the above-mentioned first embodiment have been produced experimentally. In the situation, when a contact area ratio between the CF substrate 1 and the TFT substrate 2 is defined by a ratio of an area of the portion where the CF substrate 1 and the TFT substrate 2 come into contact with each other (that is, an area of the portion where the protrusion 19 and the spacer film 20 come into contact with each other) to an area of the image display region, the contact area ratio is changed in a range of from 0.005% to 0.76%, and a thickness of the spacer film 20 is changed in a range of from 0.2 μm to 0.7 μm. Then, in order to evaluate a resistance to the generation of the low-temperature shock bubbles for the respective liquid crystal display devices 100 produced experimentally, the following low-temperature shock bubble test is implemented. Also, in order to evaluate the maintenance performance of the size of the gap formed between the CF substrate 1 and the TFT substrate 2, the following repetitive pressing test is implemented.

[Low-Temperature Shock Bubble Test]

After the liquid crystal display device 100 has been retained at −20° C. for 24 hours, a steel ball 11 mm in diameter is allowed to freely fall from a distance of 10 cm under the environment of −20° C., and to collide with the liquid crystal display device 100, and it is visually evaluated whether the low-temperature shock bubbles are generated, or not,

[Repetitive Pressing Test]

A load of 105N is repetitively exerted on an area of a diameter 10 mm of the surface of the liquid crystal display device 100 at a speed of 200 N/s five times, and it is visually evaluated whether a pressure mark is generated 1 minute after removal of the load, or not.

Table 1 shows results the respective contact area ratios of the liquid crystal display devices 100 produced experimentally, the thicknesses of the spacer films, the low-temperature shock bubble test, and the repetitive pressing test. In the respective test results, OK represents that the generation of the low-temperature shock bubbles or the pressure mark is not found, and NG represents that the generation of the low-temperature shock bubbles or the pressure mark is found. In a prototype example indicated by No. 10, no spacer film 20 is formed, and an overall top surface of the wall structure 4 comes into contact with the CF substrate 1.

TABLE 1

| Prototype No. | Contact Area Ratio [%] | Spacer film thickness [μm] | Low-Temperature Shock Bubbles Test | Repetitive Pressing Test |
| --- | --- | --- | --- | --- |
| 1 | 0.005 | 0.6 | OK | NG |
| 2 | 0.028 | 0.7 | OK | NG |
| 3 | 0.044 | 0.7 | OK | NG |
| 4 | 0.050 | 0.5 | OK | OK |
| 5 | 0.054 | 0.4 | OK | OK |
| 6 | 0.060 | 0.2 | OK | OK |
| 7 | 0.410 | 0.6 | OK | OK |
| 8 | 0.411 | 0.2 | OK | OK |
| 9 | 0.760 | 0.6 | NG | OK |
| 10 | — | — | NG | OK |

From the above results, it is found that the low-temperature shock bubbles are generated when the contact area ratio is 0.760% whereas the low-temperature shock bubbles are not generated when the contact area ratio is 0.411% (comparison of Prototype Nos. 8 and 9). Also, the pressure mark is generated when the contact area ratio falls below 0.050% (comparison of Prototype Nos. 3 and 4). Further, the pressure mark appears to be generated when the thickness of the spacer film 20 is equal to or higher than 0.7 μm (see Prototype Nos. 2 and 3). In this prototype, a minimum value of the thickness of the spacer film 20 is 0.2 μm, but particularly no problem is found (see Prototype Nos. 6 and 8).

From those facts, it is found that, generally, the contact area ratio is preferable equal or higher than 0.05% and equal to or lower than 0.41%, and the thickness of the spacer film 20 is equal to or higher than 0.2 μm and equal to or lower than 0.61 μm.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
a first substrate;
a second substrate that is disposed to face the first substrate;
a liquid crystal layer that is disposed between the first substrate and the second substrate;
the first substrate has a plurality of drain signal lines, a plurality of gate signal lines, and a plurality of wall structures of a line shape formed on the drain signal lines,
a common electrode, an insulating film, and pixel electrodes are stacked in a region between the wall structures on the first substrate,
a plurality of spacer films in contact with a part of the wall structures is arranged on the second substrate, and
a gap between the wall structures at a position not in contact with the spacer films and the second substrate.

2. The liquid crystal display device according to claim 1, wherein the spacer films are formed by overlapping end portions of adjacent color filter films formed on the second substrate with each other.

3. The liquid crystal display device according to claim 1, wherein the insulating film is formed on a side surface of the wall structures, and the pixel electrodes and the common electrode are not formed on a side surface of the wall structure at a position in contact with the spacer films.

4. The liquid crystal display device according to claim 1, wherein the insulating film, the pixel electrodes, and the common electrode are not formed on the side surface of the wall structure at a position in contact with the spacer films.

5. The liquid crystal display device according to claim 1, wherein the number of spacer films is fewer than the number of pixels.

6. The liquid crystal display device according to claim 1, wherein a center position of the wall structures at a position in contact with the spacer films in a width direction thereof is displaced from a center position of the spacer films in a width direction thereof.

7. The liquid crystal display device according to claim 1, wherein each of the wall structures is bent in the vicinity of a center thereof in a longitudinal direction thereof.

8. The liquid crystal display device according to claim 1, wherein a contact area ratio of the spacer films and the wall structures is from 0.05% or more to 0.41% or less.

9. The liquid crystal display device according to claim 1, wherein a thickness of the spacer films is from 0.2 μm or more to 0.6 μm or less.

10. The liquid crystal display device according to claim 1, wherein the pixel electrodes, the insulating film and the common electrode are formed on a side surface of the wall structure.

11. The liquid crystal display device according to claim 1, wherein an area between the wall structures has a sub-wall structure, the sub-wall structure is covered with the common electrode.

* * * * *